(12) United States Patent
Fages-Tafanelli et al.

(10) Patent No.: US 11,212,314 B2
(45) Date of Patent: Dec. 28, 2021

(54) METHOD FOR AN OBJECT TO COMMUNICATE WITH A CONNECTED OBJECTS NETWORK TO REPORT THAT A CLONE MAY BE IMPERSONATING THE OBJECT IN THE NETWORK

(71) Applicant: Idemia Identity & Security France, Courbevoie (FR)

(72) Inventors: Yoann Fages-Tafanelli, Courbevoie (FR); Aurélien Cuzzolin, Courbevoie (FR); Fabien Blanco, Courbevoie (FR); Maël Berthier, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 266 days.

(21) Appl. No.: 16/654,602

(22) Filed: Oct. 16, 2019

(65) Prior Publication Data

US 2020/0120132 A1 Apr. 16, 2020

(30) Foreign Application Priority Data

Oct. 16, 2018 (FR) ...................................... 1871190

(51) Int. Cl.
*H04L 29/06* (2006.01)

(52) U.S. Cl.
CPC ........ *H04L 63/1483* (2013.01); *H04L 63/102* (2013.01); *H04L 63/1416* (2013.01)

(58) Field of Classification Search
CPC ......................... H04L 63/1483; H04L 63/102; H04L 63/1416
USPC .......................................................... 726/23
See application file for complete search history.

(56) References Cited

U.S. PATENT DOCUMENTS

| | | | |
|---|---|---|---|
| 10,169,587 B1* | 1/2019 | Nix | G06F 21/57 |
| 2018/0227143 A1 | 8/2018 | Dottax | |
| 2018/0288013 A1* | 10/2018 | Hennebert | H04L 63/10 |
| 2018/0336551 A1* | 11/2018 | Mouftah | H04L 9/3234 |
| 2020/0100157 A1* | 3/2020 | Teboulle | H04L 67/12 |

(Continued)

FOREIGN PATENT DOCUMENTS

| | | |
|---|---|---|
| EP | 3310082 A1 | 4/2018 |
| EP | 3343967 A1 | 7/2018 |
| KR | 101996629 B1 * | 7/2019 |

OTHER PUBLICATIONS

Lee et al., "Risk analysis and countermeasure for bit-flipping attack in LoRaWAN", IEEE, doi: 10.1109/ICOIN.2017.7899554, 2017, pp. 549-551. (Year: 2017).*

(Continued)

*Primary Examiner* — Peter C Shaw
(74) *Attorney, Agent, or Firm* — Womble Bond Dickinson (US) LLP

(57) ABSTRACT

The invention proposes a method for an object (1) to communicate with a server (2) of a connected objects network to report that a clone may be impersonating the object in the network, which method comprises the following steps implemented by the object (1): transmitting (106) to the server (2) a request from the object (1) to join the connected objects network; after transmitting the join-request, detecting (110) whether a reference message (uplink) transmitted by the object (1) to the server (2) was rejected or ignored; in response to the detection, transmitting (114) to the server (2) an alert message indicating the rejection or ignoring.

11 Claims, 3 Drawing Sheets

(56) References Cited

U.S. PATENT DOCUMENTS

| | | | | |
|---|---|---|---|---|
| 2020/0100158 A1* | 3/2020 | Teboulle | ............. | H04W 36/165 |
| 2020/0107402 A1* | 4/2020 | Di Girolamo | ........ | H04W 48/17 |
| 2020/0259667 A1* | 8/2020 | Garnier | ................ | H04L 63/105 |
| 2020/0287726 A1* | 9/2020 | Garnier | ............... | H04W 12/108 |

OTHER PUBLICATIONS

Thomas et al., "Man in the Middle Attack Mitigation in LoRaWAN", IEEE, doi: 10.1109/ICICT48043.2020.9112391, 2020, pp. 353-358. (Year: 2020).*

Chen et al., "Design and Implementation of IoT DDoS Attacks Detection System based on Machine Learning", IEEE, doi: 10.1109/EuCNC48522.2020.9200909, 2020, pp. 122-127. (Year: 2020).*

Yang et al., "Security Vulnerabilities in LoRaWAN", IEEE, doi: 10.1109/IoTDI.2018.00022, 2018, pp. 129-140. (Year: 2018).*

Correspondence from the French National Institute of Industrial Property Office (INPI—Institute National De La Propriété Industrielle) for FR1871190 dated Jun. 20, 2019; Preliminary Research Report of the French National Institute of Industrial Property Office for FR1871190 dated Jun. 17, 2019; and Written Opinion on the Patentability of the Invention issued by the French National Institute of Industrial Property Office for FR1871190.

\* cited by examiner

[Fig. 1]
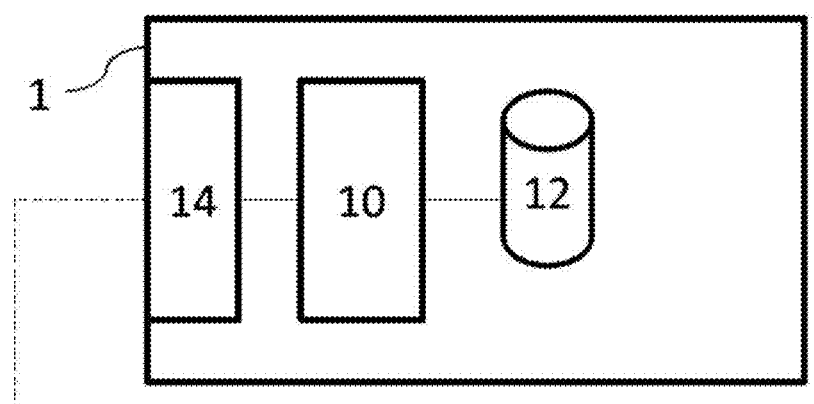
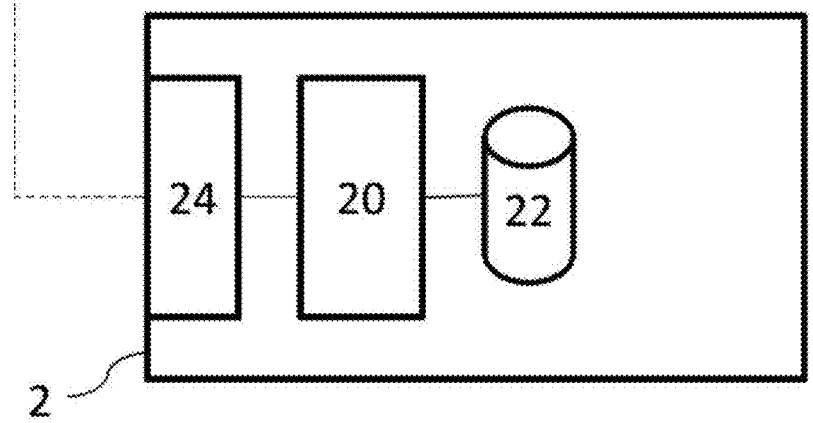

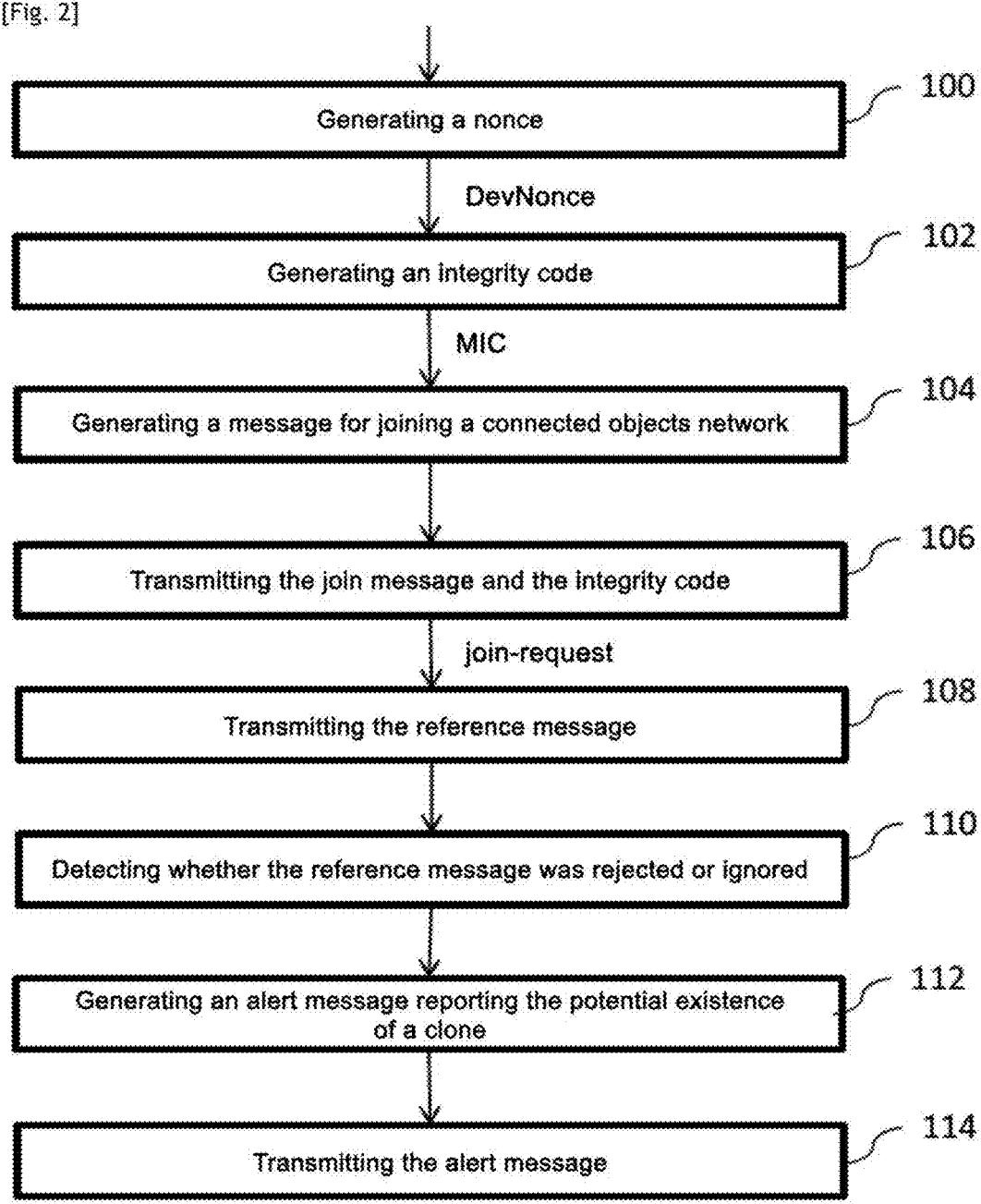

[Fig. 3]
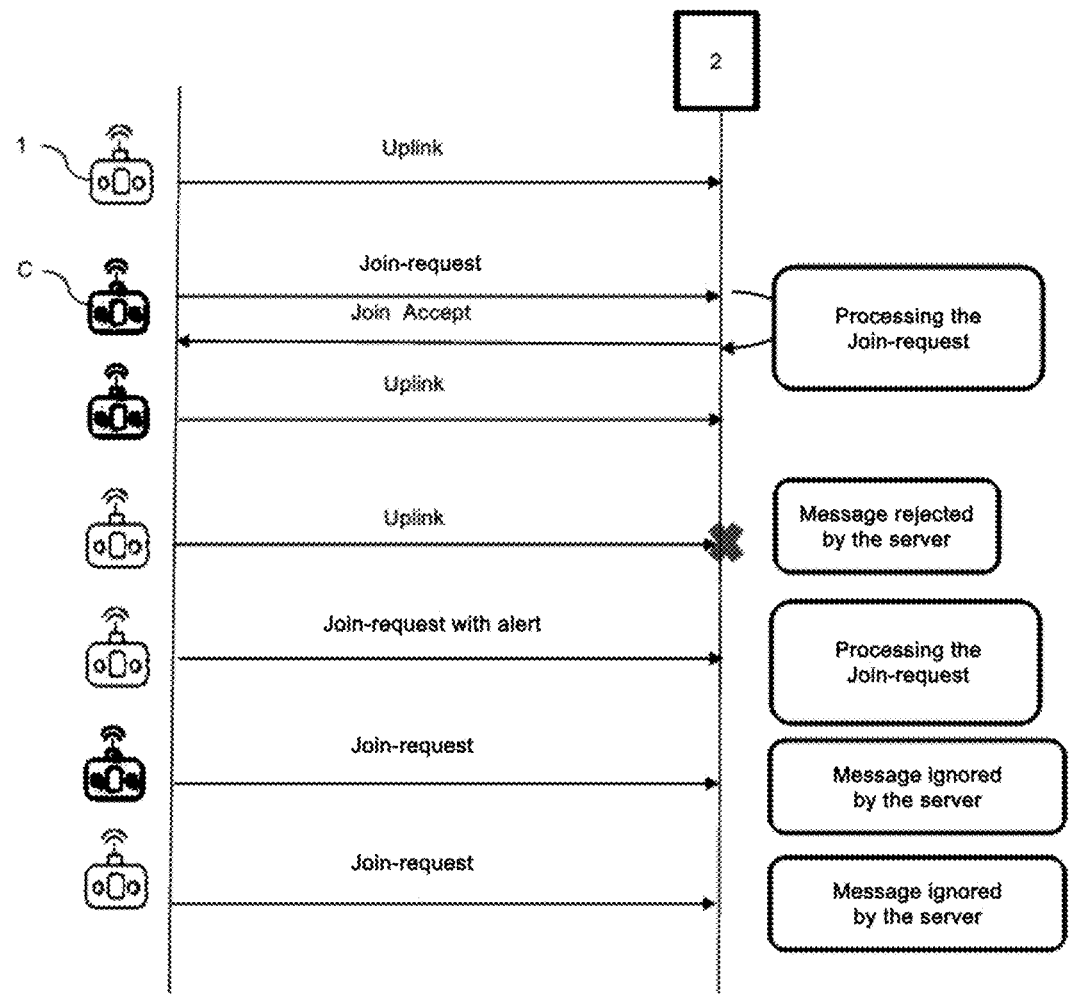

METHOD FOR AN OBJECT TO COMMUNICATE WITH A CONNECTED OBJECTS NETWORK TO REPORT THAT A CLONE MAY BE IMPERSONATING THE OBJECT IN THE NETWORK

CROSS-REFERENCE TO RELATED APPLICATIONS

This application claims benefit of French Patent Application No. 1871190 filed Oct. 16, 2018, the disclosure of which is herein incorporated by reference in its entirety.

TECHNICAL FIELD OF THE INVENTION

This invention relates to the field of connected objects.

In particular, it relates to a method for an object to communicate with a connected objects network to report that a clone may be impersonating the object in the network.

An advantageous application of the invention is in networks of connected objects that meet the LoRaWAN® specification.

STATE OF THE ART

The LoRaWAN specification defines a communication protocol for a connected objects network. In such a network, an object (sometimes called an end device) has to communicate with a server that is part of the network.

Traditionally, an object that meets the LoRaWAN specification transmits a "join-request" to a network server in order to join the network. Once the server has accepted that request, the object can then send useful data to the network.

To keep the object from being confused with another network node, the object has a unique DevUID identifier and at least one secret key (an AppKey in version 1.0 of the LoRaWAN specification, an AppKey and NwKkey pair in version 1.1). The identifier is sent in plain text in the join-request. Furthermore, each secret key is used to make the join-request content secure, though without being disclosed.

Naturally, a malicious third party that is able to discover the secret key could create a clone of the object, so that this clone itself transmits join-requests with the same content as those transmitted by the object, thereby impersonating that object to the network. This type of attack is called a clone attack.

To avoid such clone attacks, a secure element is generally provided in the object to serve as an impenetrable safe for storing the key and keeping it secret.

However, incorporating such a secure element represents an increase in the cost of manufacturing a connected object; as a result, there are many connected objects that do not have this sort of secure element to fend off clone attacks.

Furthermore, multiple methods are known from the state of the art for detecting a clone within a connected objects network.

A first known method for detecting a clone consists of sending an authentication request to the object that wants to join the network. In order to not be considered a clone, the object must then answer the request with a reply message containing an anti-cloning key.

According to a second method, a clone is detected by means of a random number transmitted over the network.

The proposed methods, however, have the drawback of requiring substantial changes in the objects to be protected from cloning (additional cryptographic operations, storing more data in the objects, additional communications between objects).

OVERVIEW OF THE INVENTION

One purpose of the invention is to report the potential existence of a clone that may be impersonating an object in a connected network, in a way that is very simple and inexpensive to implement.

The invention therefore proposes a method for an object to communicate with a server of a connected objects network to report that a clone may be impersonating the object in the network, which method comprises the following steps implemented by the object:

transmitting to the server a request from the object to join the connected objects network, after transmitting the join-request, detecting whether a reference message transmitted by the object to the server was rejected or ignored, in response to the detection, transmitting to the server an alert message indicating the rejection or ignoring.

The communication method according to the invention may also comprise the following characteristics, taken alone or in combination when technically possible.

Preferably, the alert message is a new request to join the connected objects network.

Preferably, the join-request transmitted before detection comprises a first value that does not indicate whether any message transmitted by the object to the server was rejected or ignored, and the new join-request comprises, in place of the first value, a second value indicating rejection or ignoring.

Preferably, the first value is a nonce meant to be used by the server to detect replay attacks.

Preferably, the first value occupies a predetermined slot of N bits in the join-request transmitted before detection, the second value occupies the same predetermined slot of N bits in the new join-request, and the second value is equal to zero or $2N-1$.

Preferably, the first value and the second value occupy the DevNonce field defined by a LoRaWAN specification.

Preferably, the reference message is transmitted by the object to the server after the join-request, and carries, for instance, useful data.

Preferably, the reference message is detected as having been ignored when no acknowledgment of receipt of the reference message has been received by the object within a predetermined length of time following the transmission of the reference message.

Preferably, the communication method further comprises the server rejecting or ignoring a join-request that is transmitted to the server after the alert message and comprises a unique identifier specific to the object.

Preferably, the join-request or reference message comprises an integrity code generated based on a first secret key specific to the object, and wherein the alert message comprises an integrity code generated based on a second secret key specific to the object, different from the first secret key.

Preferably, the integrity code of the join-request or of the reference message is generated by applying a predetermined function to the first secret key specific to the object, and wherein the integrity code of the alert message is generated by applying the same predetermined function to the second secret key specific to the object.

The invention also proposes an object comprising an interface for communicating with a server of a connected objects network, the object further comprising a processor configured to:

order a request for the object to join the connected objects network, to be transmitted to the server, after transmitting the join-request, detect whether a reference message transmitted by the object to the server was rejected or ignored, in response to the detection, order that an alert message indicating the rejection or ignoring be transmitted to the server.

The invention also proposes a system comprising the aforementioned connected object, and a server of a connected objects network, configured to, upon receipt of the alert message, implement processing to detect whether a clone is impersonating the object on the network.

The server may be configured to reject or ignore a join-request that is transmitted to the server after the alert message and comprises a unique identifier specific to the object.

DESCRIPTION OF THE FIGURES

Other characteristics, goals, and advantages of the invention will become clear from the following description, which is purely illustrative and non-limiting, which must be read in the context of the attached drawings in which:

FIG. 1 schematically depicts a navigation system according to a first embodiment of the invention;

FIG. 2 is a flowchart of steps of a communication method according to one embodiment of the invention;

FIG. 3 schematically depicts messages exchanged by an object, a connected objects network server, and a clone seeking to impersonate the object on the network, within one implementation of the method of FIG. 2.

In the set of figures, similar elements are marked with identical references.

DETAILED DESCRIPTION OF THE INVENTION

FIG. 1 schematically depicts an object 1 that may be connected to a connected objects network via a server 2.

The object 1 comprises at least one processor 10, at least one memory 12, and an interface 14 for communicating with the server 2.

The processor 10 is configured to execute computer programs.

The communication interface 14 is, for instance, of the wireless radio type.

The following shall examine the example of a communication interface 14 intended to transmit or receive messages in accordance with the LoRaWAN® specification, in which case the connected objects network is a network that also complies with that LoRaWAN specification.

The memory 12 of the object 1 comprises at least one nonvolatile memory that is intended to persistently store calculation data (HDD, SSD, Flash, etc.), in particular the following data, when the LoRaWAN specification version 1 is used:

DevEUI: An identifier specific to the object 1, comparable to a serial number.

AppEUI: A unique application identifier specific to an application provider of the object 1. It makes it possible to classify different objects such as the object 1 by application.

In the LoRaWAN specification version 1.1, which may also be used, AppEUI is replaced by an item of data known as JoinEUI.

Similarly, the server 2 comprises at least one processor 20, at least one memory 22, and an interface 24 for communicating with at least one object such as the object 1.

The processor 20 of the server 2 is also configured to execute computer programs.

The memory 22 of the server 2 comprises at least one nonvolatile memory that is intended to persistently store calculation data (HDD, SSD, Flash, etc.).

The communication interface 24 is configured to interact with the communication interface 14 of the object 1; consequently, it is of the same type.

With reference to the flowchart of FIG. 2, a method to report the potential existence of a clone of the object 1 within the connected objects network comprises the following steps.

The processor 10 of the object 1 generates a nonce (step 100). As detailed below, this nonce is intended to be passed as a parameter of a request to join a connected objects network, transmitted by the object 1 to the server 2. The server 2 keeps a record of certain values of that nonce which were used by the object 1 in the past, and ignores any join-request that reuses one of those values, so as to ensure protection against replay attacks.

The nonce is a value within a range of predetermined N-bit values.

The range of values does not contain all predetermined values which are N bits. In other words, this range comprises a number of integer values strictly less than $2^N$.

The range of values comprises, for instance, $2^N-1$ values; in such a case, there is only one N-bit value, which cannot take the nonce.

The nonce is, for instance, the data DevNonce defined in the LoRaWAN specification. This data is coded as two bytes (N=16). In such a case, the nonce may have 65535 different values (rather than 653536 as proposed in the LoRaWAN specifications).

The processor 10 of the object 1 generates a request to join a connected objects network (step 104).

The request to join is a "join-request" message in accordance with the LoRaWAN specification. In such a case, the join-request message conventionally comprises the following data: DevEUI, AppEUI (or JoinEUI), and DevNonce.

Object 1 further generates an integrity code MIC related to the join-request (step 102). The purpose of this integrity code MIC is to authenticate the join-request with a recipient; in other words, to allow such a recipient to verify whether the join-request was transmitted by an approved object 1 and whether the data contained in the join-request is consistent.

The integrity code MIC is generated traditionally via AES encryption using at least one secret key specific to the object 1: For instance, the AppKey in version 1.0 of the LoRaWAN specification, or an AppKey and NwKkey pair in version 1.1 of the LoRaWAN specification.

The join-request is transmitted by the communication interface to the server 2 (step 106). The integrity code MIC is also transmitted to the server 2 in the join-request.

The join-request is received by the communication interface 24 of the server 2, which transmits it to the processor 20 to be processed.

The processor 20 traditionally implements an integrity control of the join-request, with the assistance of the candidate integrity code MIC. If this control fails, then the join-request is rejected or ignored by the server 2.

Furthermore, the processor 20 compares the value DevNonce of the received join-request with a history of DevNonce values previously received and saved in the memory 22. If the received DevNonce value is equal to one of the historical values, the server 2 rejects or [WORD MISSING?] any join-request, so as to ensure protection from replay attacks.

Conventionally, the server 2 transmits to the object 1 a "join-accept" reply message, indicating to it that the join-request has been accepted by the server 2. Otherwise, the server 2 does not transmit, for instance, any "join-accept" reply message.

Object 1, which has now joined the connected objects network, can transmit to the server 2 other types of messages, such as messages hereafter formally known as "reference messages" (step 108).

To be accepted by the server 2, those messages are supposed to be consistent with the last join-request received and accepted by the server 2.

In the case of LoRaWAN (specification 1), this consistency is ensured by two session keys, NwkSKey and AppSKey, which are used to encrypt and authenticate messages exchanged by the object 1 and server 2. For the object 1, those session keys NwkSKey and AppSKey are derived from the secret key AppKey, and are renewed for each new join-request (using counters). Those session keys are also determined by the server 2 based on the information provided in the join-request, without those session keys being transmitted in plaintext in the join-request, using a known method. All reference messages transmitted later by the object 1 comprise an integrity code (MIC field) which is calculated based on the session keys NwkSKey and AppSKey negotiated with the server 2.

An example reference message is a message containing useful data. "Useful" data means data different from metadata with the function of controlling the communication of useful data.

The "uplink" message defined in the LoRaWAN specification is a message carrying useful data, and as a result constitutes an example of a reference message.

When the server 2 receives a reference message, it can acknowledge receipt thereof to the object 1 via an acknowledgment of receipt message that is returned to the object 1. In particular, an "ACK" acknowledgment of receipt message may be transmitted by the server 2 in response to the receipt of an "uplink" message requesting such an acknowledgment of receipt ("confirmed uplink"), in the case of a LoRaWAN network.

However, it should be noted that an "uplink" message of a type that does not require an acknowledgment of receipt can be transmitted by the object 1. When the server 2 receives that type of message, it therefore does not send an acknowledgment of receipt "ACK" to the object 1.

However, in some cases the server 2 may not transmit such an acknowledgment of receipt message to the object 1 in response to a reference message, and rejects that reference message.

Such a phenomenon typically occurs when a clone seeking to impersonate the object 1 transmits a join-request to the server 2 comprising the DevUID that makes it possible to identify properly the object 1, and that this join-request is accepted by the server 2, right before the object 1 sends an uplink message.

Indeed, the acceptance by the server 2 of the join-request transmitted by the clone leads to the server 2 updating the session keys NwkSKey and AppSKey associated with the identifier DevUID, without the object 1 being informed of it.

Thus, any reference message transmitted by the object 1 after acceptance of that "pirate" join-request by the server 2 will be rejected, as their integrity codes MIC had not been calculated from the last NwkSKey and AppSKey session keys accepted by the server 2.

Such a scenario is illustrated in FIG. 3, which shows message exchanges between the object 1 implementing the method of FIG. 2, the server 2, and a clone C seeking to impersonate the object 1 within a LoRaWAN network. In FIG. 3, the clone C is depicted by a dark icon, and the object 1 is depicted by a relatively light icon.

The object 1 implements a step of detecting the rejection or ignoring of a reference message transmitted by the object 1 to the server 2 (step 110).

For instance, the object 1 detects the reference message as having been ignored or rejected when no acknowledgment of receipt of the reference message has been received by the object 1 within a predetermined length of time following the transmission of the reference message. To do so, the object 1 may use a time counter that is reset whenever the time limit expires or an acknowledgment of receipt is received.

In response to the detection 110, the object 1 transmits to the server 2 generates an alert message indicating the rejection or ignoring of the reference message (step 112), and transmits it to the server 2 (step 114).

It should be noted that step 114 of transmitting the alert message may be triggered after only one failed attempt to transmit a reference message, or even after only N failed attempts to transmit a reference message, N being strictly greater than 1, for example equal to 3.

Preferably, the alert message is a new request to join the connected objects network. This has several benefits. First, reusing a request that already exists in the communication protocol being used means that the communication protocol is not made substantially more complicated. In other words, this additional alert function is consequently easier to deploy via updating in an already-in-use object 1. Second, specifically using a join-request to provide this alert function has the benefit of limiting communication exchanges, to enable the object 1 to not only report an alert, but also to immediately resume the communication that had been tacitly interrupted by the clone C.

In the following, a distinction is made between join-requests with an alert function, and traditional join-requests that do not provide that additional alert function.

Generally speaking, a join-request with an alert function is distinct from a traditional join-request in the following manner:
  A traditional join-request comprises, in a predefined slot, a first value that does not indicate the rejection or ignoring of any reference message transmitted by the object 1.
  A join-request with an alert function comprises, in place of the first value in the same predefined slot, a second value that does indicate the rejection or ignoring of a reference message transmitted by the object 1.

As previously indicated, the DevNonce field of a "join-request" message is occupied by a nonce having a first value chosen from a predetermined range of values.

Consequently, a "join-request" with an alert function preferably differs from a "join-request" without an alert function in that the first value in the DevNonce field is replaced with a second value excluded from that predetermined range of values, that second value itself being pre-determined.

Preferably, the second value is equal to 0 or equal to $2^N-1$ (meaning the number whose representation comprises N bits all equal to 1). These two particular values are the minimum and maximum N-bit values.

In particular, the DevNonce field comprises 2 bytes (N=6). The second value can in this case be equal to 0x0000 or 0xFFFF.

Choosing either of the extreme values 0 et $2^N-1$ has the benefit of doing little to disrupt the operation of the server 2 that uses the content of the DevNonce field to detect replay attacks, because all the values that the nonce transmitted in the DevNonce field of a traditional join-request can take are chosen from a single interval. This is particularly true in certain embodiments where the nonce that the object 1 inserts into the DevNonce field is not chosen totally randomly, but rather by incrementing a counter.

Among those two values, choosing $2^N-1$ as a second (alert) value has the benefit of minimally disrupting such counter-based implementations, because a counter is traditionally reset to the value 0. Conversely, choosing 0 as a second (alert value) has the benefit of being clearly identifiable because it is independent of N.

Alternatively, one bit out of the N in the DevNonce field may be reserved for the potential cloning alert (for instance, 1 may mean the alert, while 0 may mean the absence of an alert). This alternative, however, has the drawback of roughly halving the size of the range of values from which the nonce can be chosen, which consequently reduces the effectiveness of the mechanism for protecting against replay attacks, for which that nonce is intended.

When it receives the alert message via its communication interface 16, the server 2 is informed of the potential existence of a clone in the network impersonating the object 1, and may remedy it through appropriate processing.

In response to the receipt of such an alert message, one radical solution that the processor 20 can implement to prevent the clone C from accessing the connected objects network is simply to reject any later join-request that would include the same DevEUI as the one reported in the join-request with the alert.

To strengthen the trustworthiness of the transmitted alert message, it may be provided to include in the alert message an integrity code (MIC in the case of LoRaWAN) generated by the object 1 based on a secret key different from the one used to generate an integrity code included in a traditional join-request. The functions that use these two different keys as inputs to generate integrity codes in the alarm message and in a traditional join-request are identical. This mechanism has the benefit of being easy to deploy in existing networks, particularly in the event that the alert message is actually a join-request containing alert information.

The invention claimed is:

1. A method for an object (1) to communicate with a server (2) of a connected objects network to report that a clone may be impersonating the object in the network, which method comprises the following steps implemented by the object (1):
   transmitting (106) to the server (2) a request from the object (1) to join the connected objects network,
   after transmitting the request, detecting (110) whether a reference message (uplink) transmitted by the object (1) to the server (2) was rejected or ignored,
   in response to the detection, transmitting (114) to the server (2) an alert message indicating the rejection or ignoring, wherein the request transmitted before the detection comprises a nonce, the alert message is a new request to join the connected objects network, and the new request comprises, in place of the nonce, a value indicating that the reference message transmitted by the object to the server was rejected or ignored.

2. The method according to claim 1, wherein the first value occupies a predetermined slot of N bits in the join-request transmitted before detection, the second value occupies the same predetermined slot of N bits in the new join-request, and the second value is equal to zero or 2N1.

3. The method according to claim 1, wherein the first value and the second value occupy the DevNonce field defined by the LoRaWAN specification.

4. The method according to claim 1, wherein the reference message is transmitted by the object (1) to the server after the join-request, and carries, for instance, useful data.

5. The method according to claim 1, wherein the reference message is detected as having been ignored when no acknowledgment of receipt of the reference message is received by the object within a predetermined length of time following the transmission of the reference message.

6. The method according to claim 1, further comprising the server rejecting or ignoring a join-request that is transmitted to the server after the alert message and comprises a unique identifier specific to the object.

7. The method according to claim 1, wherein the join-request or the reference message comprises an integrity code generated based on a first secret key specific to the object (1), and wherein the alert message comprises an integrity code generated based on a second secret key specific to the object (1), different from the first secret key.

8. The method according to the preceding claim, wherein the integrity code of the join-request or of the reference message is generated by applying a predetermined function to the first secret key specific to the object (1), and wherein the integrity code of the alert message is generated by applying the same predetermined function to the second secret key specific to the object (1).

9. An object (1) comprising an interface for communicating (14) with a server (2) of a connected objects network, the object (1) further comprising a processor (10) configured to:
   order a request for the object (1) to join the connected objects network, to be transmitted to the server (2),
   after transmitting the request, detect whether a reference message transmitted by the object (1) to the server (2) was rejected or ignored,
   in response to the detection, order that an alert message indicating the rejection or ignoring be transmitted to the server (2), wherein the request tranmitted before the detection comprises a nonce, the alert message is a new request to join the connected objects network and the new request comprises, in place of the first nonce, a value indicating that the reference message transmitted by the object to the server was rejected or ignored.

10. A system comprising an object according to the preceding claim, and the server of the connected objects network configured to:—upon receipt of the alert message, implement processing making it possible to detect whether a clone is impersonating the object in the network.

11. The system according to the preceding claim, wherein the server is further configured to reject or ignore a join-request that is transmitted to the server after the alert message and comprises a unique identifier specific to the object.

* * * * *